United States Patent
Lin et al.

(10) Patent No.: US 10,388,239 B2
(45) Date of Patent: *Aug. 20, 2019

(54) DISPLAYS WITH SERIES-CONNECTED SWITCHING TRANSISTORS

(71) Applicant: Apple Inc., Cupertino, CA (US)

(72) Inventors: Chin-Wei Lin, San Jose, CA (US); Jungbae Kim, San Jose, CA (US); Kyung Wook Kim, Saratoga, CA (US); Minkyu Kim, Santa Clara, CA (US); Shih Chang Chang, Cupertino, CA (US); Vasudha Gupta, Cupertino, CA (US); Young Bae Park, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,741

(22) Filed: Sep. 27, 2018

(65) Prior Publication Data

US 2019/0035346 A1 Jan. 31, 2019

Related U.S. Application Data

(63) Continuation of application No. 14/942,068, filed on Nov. 16, 2015, now Pat. No. 10,121,430.

(51) Int. Cl.
*G09G 3/36* (2006.01)
*G09G 3/3233* (2016.01)
(Continued)

(52) U.S. Cl.
CPC ......... *G09G 3/3648* (2013.01); *G02F 1/1368* (2013.01); *G02F 1/13624* (2013.01);
(Continued)

(58) Field of Classification Search
None
See application file for complete search history.

(56) References Cited

U.S. PATENT DOCUMENTS 8,659,518 B2 * 2/2014 Nathan ................ G09G 3/3233
345/76
9,129,927 B2 * 9/2015 Gupta ................ H01L 27/3262
(Continued)

FOREIGN PATENT DOCUMENTS

KR 20120028225 3/2012
WO 2012164474 12/2012

*Primary Examiner* — David D Davis
(74) *Attorney, Agent, or Firm* — Treyz Law Group, P.C.; Tianyi He

(57) ABSTRACT

A display may have an array of light-emitting diode pixels or pixels containing portions of a liquid crystal layer to which electric fields are applied using electrodes. A pixel with a light-emitting diode may have a drive transistor coupled in series with the light-emitting diode. A storage capacitor may be coupled to a gate of the drive transistor. A pixel with a liquid crystal portion may have a storage capacitor coupled to a given one of the electrodes in that pixel. Switching circuitry in each pixel may be used to load data from a data line into the storage capacitor of the pixel. The switching circuitry may include a semiconducting-oxide transistor coupled to an associated data line and a series-connected silicon transistor that is coupled to the storage capacitor.

19 Claims, 7 Drawing Sheets

(51) Int. Cl.
*G02F 1/1343* (2006.01)
*G02F 1/1362* (2006.01)
*G02F 1/1368* (2006.01)

(52) U.S. Cl.
CPC .. *G02F 1/134363* (2013.01); *G02F 1/136213* (2013.01); *G02F 1/136286* (2013.01); *G09G 3/3233* (2013.01); *G09G 2300/0842* (2013.01); *G09G 2320/043* (2013.01)

(56) References Cited

U.S. PATENT DOCUMENTS

| | | | |
|---|---|---|---|
| 9,685,469 B2 | 6/2017 | Kim et al. | |
| 2006/0043375 A1* | 3/2006 | Takasugi | G09G 3/3233 257/72 |
| 2006/0125408 A1* | 6/2006 | Nathan | G09G 3/3233 315/169.3 |
| 2006/0176250 A1* | 8/2006 | Nathan | G09G 3/3233 345/76 |
| 2006/0208971 A1* | 9/2006 | Deane | G09G 3/3233 345/76 |
| 2008/0150843 A1* | 6/2008 | Yamamoto | G09G 3/3233 345/76 |
| 2009/0207105 A1* | 8/2009 | Hwang | G09G 3/3233 345/76 |
| 2010/0207920 A1* | 8/2010 | Chaji | G09G 3/3233 345/211 |
| 2011/0284722 A1 | 11/2011 | Ahn et al. | |
| 2012/0299978 A1* | 11/2012 | Chaji | G09G 3/3291 345/690 |
| 2015/0055051 A1* | 2/2015 | Osawa | H01L 27/1225 349/48 |
| 2015/0310801 A1* | 10/2015 | Lin | G09G 3/3225 345/205 |

* cited by examiner

DISPLAYS WITH SERIES-CONNECTED SWITCHING TRANSISTORS

This application is a continuation of U.S. patent application Ser. No. 14/942,068, filed Nov. 16, 2015, which is hereby incorporated by reference herein in its entirety. This application claims the benefit of and claims priority to U.S. patent application Ser. No. 14/942,068, filed Nov. 16, 2015.

BACKGROUND

This relates generally to electronic devices and, more particularly, to electronic devices with displays that have thin-film transistors.

Electronic devices often include displays. For example, cellular telephones and portable computers include displays for presenting information to users.

Displays such as organic light-emitting diode displays have an array of pixels based on light-emitting diodes. Drive transistors may be used to control the application of drive currents to the light-emitting diodes. In liquid crystal displays, pixels include electrodes for applying electric fields to a liquid crystal layer. Thin-film transistor circuitry in organic light-emitting diode displays and liquid crystal displays may be used to control the loading of data into the pixels of the display.

If care is not taken, the thin-film transistor circuitry of a display may exhibit excessive transistor leakage current, slow switching speeds, or other issues. This can cause displays to consume more power than desired or to perform inadequately.

It would therefore be desirable to be able to provide improved electronic device displays.

SUMMARY

A display may have an array of pixels. Display driver circuitry may supply data to columns of the pixels over data lines. Control lines may be used to supply control signals to the array of pixels from the display driver circuitry.

The display may be a light-emitting diode display having pixels with light-emitting diodes such as organic light-emitting diodes or may be a liquid crystal display in which pixels have electrodes for applying electric fields to associated portions of a liquid crystal layer.

A pixel with a light-emitting diode may have a drive transistor coupled in series with the light-emitting diode. A storage capacitor may be coupled to a gate of the drive transistor and may be used to store data loaded into the pixel. A pixel in a liquid crystal display may have a storage capacitor coupled to a given one of the electrodes in that pixel.

Switching circuitry in each pixel may be used to load data from a data line into the storage capacitor of the pixel. The switching circuitry may include a semiconducting-oxide transistor coupled to the data line and a series-connected silicon transistor that is coupled to the storage capacitor. The semiconducting-oxide transistor may receive a global control signal from the display driver circuitry while the silicon transistor receives an independent control signal from the display driver circuitry or the gates of the semiconducting-oxide transistor and silicon transistor may be shorted together so that a common control signal controls both the semiconducting-oxide transistor and the silicon transistor.

Further features will be more apparent from the accompanying drawings and the following detailed description.

DETAILED DESCRIPTION

Figure 1:
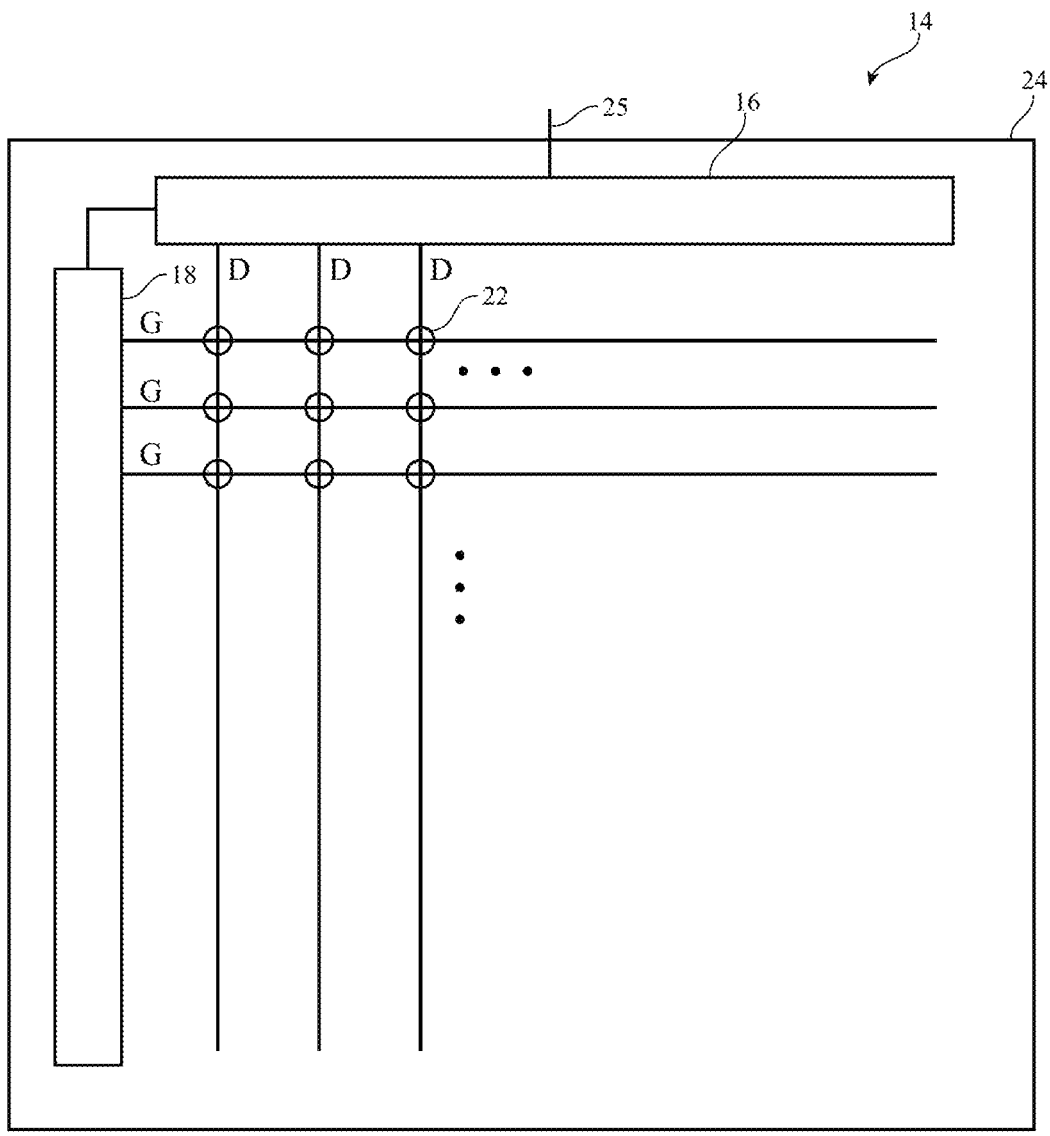
FIG. 1 is a diagram of an illustrative display in accordance with an embodiment.

A display in an electronic device may be provided with driver circuitry for displaying images on an array of pixels. An illustrative display is shown in FIG. 1. As shown in FIG. 1, display 14 may have one or more layers such as substrate 24. Layers such as substrate 24 may be formed from insulating materials such as glass, plastic, ceramic, and/or other dielectrics. Substrate 24 may be rectangular or may have other shapes. Rigid substrate material (e.g., glass) or flexible substrate material (e.g., a flexible sheet of polymer such as a layer of polyimide or other materials) may be used in forming substrate 24.

Display 14 may have an array of pixels 22 (sometimes referred to as pixel circuits) for displaying images for a user. The array of pixels 22 may be formed from rows and columns of pixel structures on substrate 24. There may be any suitable number of rows and columns in the array of pixels 22 (e.g., ten or more, one hundred or more, or one thousand or more).

Display 14 may include display driver circuitry such as data line driver circuitry and other display driver circuitry 16 and gate driver circuitry 18. Gate driver circuitry 18 may be formed along one or more sides of display 14. The example of FIG. 1 in which gate driver circuitry 18 extends along the left edge of display 14 is merely illustrative.

Display driver circuitry 16 and gate driver circuitry 18 may contain thin-film transistor circuitry and/or one or more integrated circuits. Circuitry 16 may be coupled to control circuitry in an electronic device in which display 14 is mounted using paths such as path 25. Path 25 may be formed from traces on a flexible printed circuit or other cable. The control circuitry may be located on a main logic board in an electronic device such as a cellular telephone, computer, set-top box, media player, portable electronic device, wristwatch device, tablet computer, or other electronic equipment in which display 14 is being used. During operation, the control circuitry may supply display driver circuitry 16 with information on images to be displayed on display 14. To display the images on pixels 22, the display driver circuitry may supply corresponding image data to data lines D while issuing clock signals and other control signals to supporting display driver circuitry such as gate driver circuitry 18. Gate driver circuitry 18 may be formed on substrate 24 (e.g., on the left and right edges of display 14, on only a single edge of display 14, or elsewhere in display 14) and may be used in supplying control signals to pixels 22. These control signals may be used to direct pixels 22 to load data from data lines D into pixels 22.

With the illustrative arrangement of FIG. 1, data lines D run vertically through display 14. Each data line D is associated with a respective column of pixels 22. Gate lines G run horizontally through display 14. Each gate line G is associated with a respective row of display pixels 22. Gate driver circuitry 18 may be located on the left side of display 14, on the right side of display 14, or on both the right and left sides of display 14, as shown in FIG. 1.

Gate driver circuitry 18 may assert gate signals (sometimes referred to as scan signals, emission enable signals, sense signals, or horizontal control signals) on the gate lines G in display 14. There may be one or more horizontal control signals provided to each row of pixels 22. For example, gate driver circuitry 18 may receive clock signals and other control signals from display driver integrated circuit 16 and may, in response to the received signals, assert one or more gate signals on one or more gate lines Gin each row of pixels 22. Horizontal control signals on gate lines G may be used to control rows of pixels 22 in sequence, starting with the pixels in the first row of display 14. For example, a data loading control signal may be asserted for each row of the pixels 22 in display 14 in sequence during data loading operations. This causes the pixels in each row to be sequentially loaded with the data appearing on the data lines D.

Display driver circuitry such as circuits 16 and 18 may be implemented using one or more integrated circuits and/or thin-film transistor circuitry on substrate 24. Thin-film transistors, thin-film capacitors, and other thin-film circuitry may be used in forming pixels 22. To enhance display performance, thin-film transistor structures in display 14 may be used that satisfy desired criteria such as leakage current, switching speed, drive strength, uniformity, etc. The thin-film transistors in display 14 may, in general, be formed using any suitable type of thin-film transistor technology (e.g., silicon-based, semiconducting-oxide-based, etc.).

With one suitable arrangement, which is sometimes described herein as an example, the channel region (active region) in some thin-film transistors on display 14 is formed from silicon (e.g., silicon such as polysilicon deposited using a low temperature process, sometimes referred to as LTPS or low-temperature polysilicon) and the channel region in other thin-film transistors on display 14 is formed from a semiconducting oxide material (e.g., amorphous indium gallium zinc oxide, sometimes referred to as IGZO). If desired, other types of semiconductors may be used in forming the thin-film transistors such as amorphous silicon, semiconducting oxides other than IGZO, etc. Considerations such as leakage current, switching speed, power consumption, real estate consumption, hysteresis, transistor uniformity, and other considerations may be taken into account when determining whether to form a given transistor from a semiconducting-oxide active region or a silicon active region.

In a hybrid display configuration, silicon transistors (e.g., LTPS transistors) may be used where attributes such as switching speed and good reliability are desired (e.g., for drive transistors to drive current through organic light-emitting diodes in pixels). Semiconducting-oxide transistors (e.g., IGZO transistors) may be used where low leakage current is desired.

In some arrangements, display 14 may implement a variable refresh rate scheme. With this type of arrangement, the refresh rate of display 14 may be slowed to a low rate whenever static content is present on display 14, thereby conserving power that would otherwise be dissipated by refreshing the display. In variable refresh rate displays, the refresh rate for pixels 22 may sometimes be reduced to low values such as 1 Hz (rather than a normal frame rate of 60 Hz). To optimize display performance in display 14 (e.g., a display such as variable refresh rate display), it may be desirable to use a series-connected pair of data loading transistors in each pixel.

Figure 2:
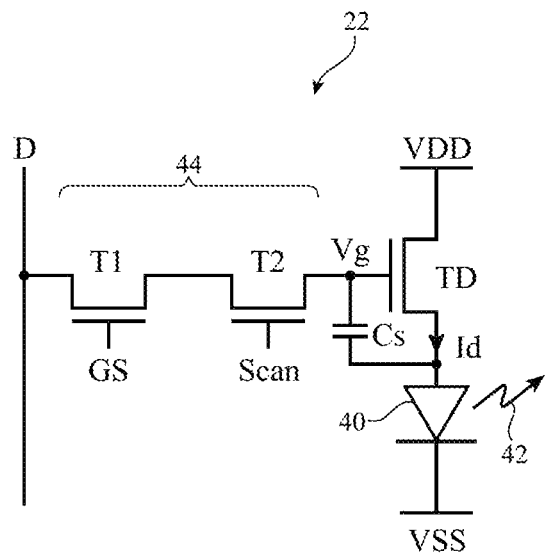
FIG. 2 is a diagram of an illustrative pixel circuit for a display having pixels with light-emitting diodes in accordance with an embodiment.
Figure 4:
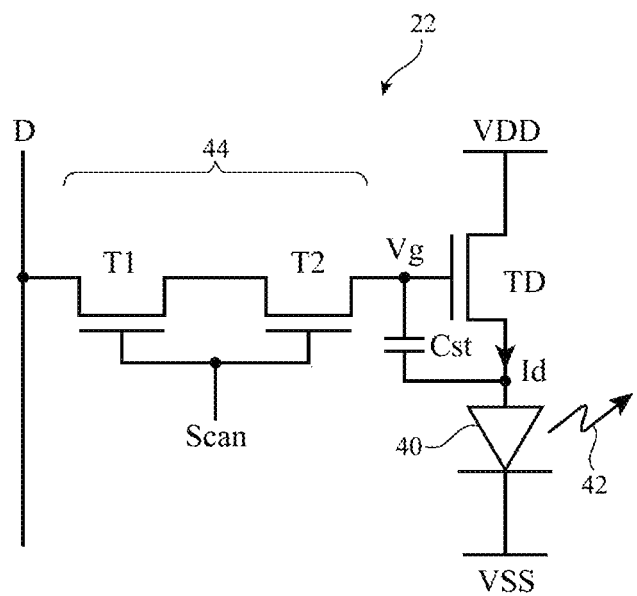
FIG. 4 is a diagram of another illustrative pixel circuit for a display having pixels with light-emitting diodes in accordance with an embodiment.

An illustrative pixel circuit for a pixel that contains a pair of series-connected transistors for data loading into the pixel is shown in FIG. 4. As shown in FIG. 2, pixel 22 may include a light-emitting diode such as light-emitting diode 40 (e.g., an organic light-emitting diode, a micro-light-emitting diode, a quantum dot light-emitting diode, etc.). Drive transistor TD may be coupled in series with light-emitting diode 40 between positive power supply terminal Vdd and ground power supply terminal Vss. The voltage Vg on the gate of drive transistor TD establishes the level of drive current Id that flows through transistor TD and light-emitting diode 40 and thereby controls the amount of light 42 that is emitted from light-emitting diode 40.

During data loading operations, data loading circuitry such as switching circuitry 44 is turned on and forms a short circuit path between data line D and the gate of transistor TD. This allows a data signal (voltage) on data line D to be loaded onto data storage capacitor Cs. After data loading is complete, data switching circuitry 44 may be turned off to form an open circuit between data line D and storage capacitor Cs. Capacitor Cs will then maintain the data signal on the gate of drive transistor TD to ensure that current Id is held at a desired level for the duration of the image frame being displayed on display 14.

In the illustrative arrangement of FIG. 2, switching circuitry 44 is formed from a pair of series-connected transistors: transistor T1 and transistor T2. With one suitable arrangement, which may sometimes be described herein as an example, transistor T1 is formed from a semiconducting-oxide transistor and transistor T2 is formed from a silicon transistor (e.g., an LTPS transistor). Using a hybrid data loading circuit of this type, the performance of display 14 may be enhanced over schemes that use only a single type of transistor for forming a data loading circuit.

Silicon transistors may exhibit more leakage current and may be less stable than semiconducting-oxide transistors, but oxide transistors may exhibit relatively large gate-source capacitances, which can lead to undesired kickback voltages if oxide transistors are coupled directly to the gates of drive transistors TD. With the arrangement of FIG. 2, silicon transistor T2 is coupled to the gate of drive transistor TD, so the source-gate capacitance associated with transistor T2 is small and will not perturb the level of the data voltage stored on storage capacitor Cs (i.e., there will be a small kickback during switching of transistor T2). Transistor T1 is a semiconducting-oxide transistor that exhibits low leakage current. Transistor T1 is coupled in series with transistor T2, so the presence of low-leakage in transistor T1 helps ensure that circuitry 44 exhibits low leakage.

The mobility of the semiconducting-oxide material of transistor T1 may be less than the mobility of the silicon of transistor T2, so transistor T1 may switch more slowly than transistor T2. With one suitable arrangement, all of transistors T1 in display 14 may be switched using a common (global) signal such as global control signal GS. Transistors T2 may then be controlled on a row-by-row basis. In particular, the transistors T2 in each row may be controlled using a SCAN signal that is applied to the gates of all of the transistors T2 in that row (i.e., a signal that is distributed on the gate line G of that row).

Figure 3:
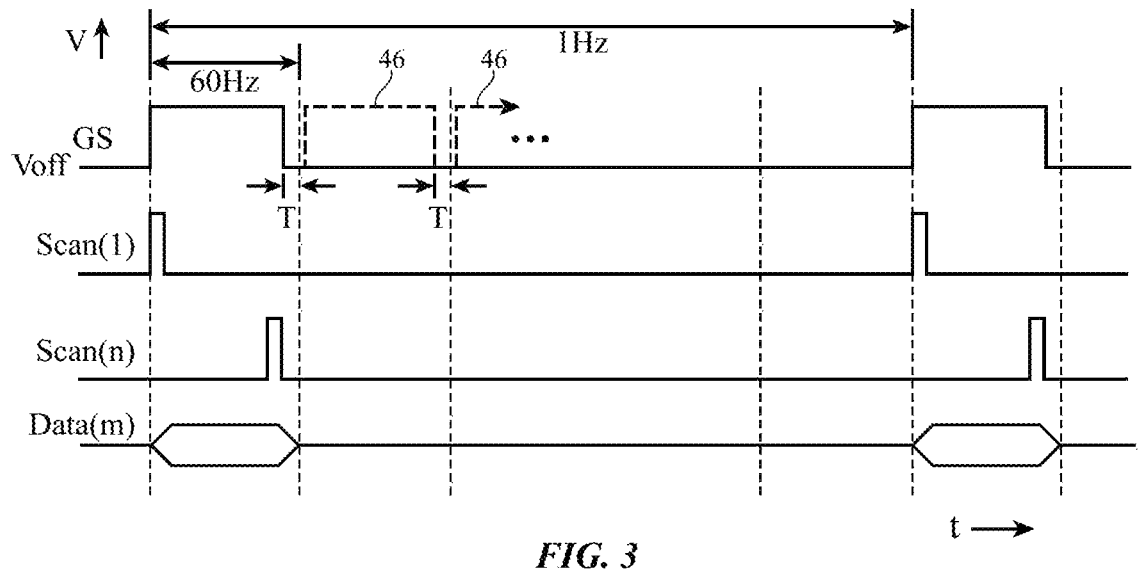
FIG. 3 is a timing diagram showing illustrative signals involved in operating a display having pixels of the type shown in FIG. 2 in accordance with an embodiment.

An illustrative timing diagram showing signals that may be used in controlling the operation of display 14 in a configuration in which pixels 22 in display 14 have circuitry of the type shown in FIG. 2 is shown in FIG. 3. In the example of FIG. 3, display 14 is a variable refresh rate display and operates at one or more high rates (e.g., 60 Hz) during normal operation and at one or more low rates (e.g., 1 Hz, 5 Hz, etc.) during low power operation when static content is being displayed.

As shown by line 46 in FIG. 3, in normal mode operation, global signal GS may be asserted to turn on all of transistors T1 in display 14 every 1/60 sec. Within each 1/60 sec period during which transistor T1 is on, the transistors T2 in each row of display 14 may be turned on in sequence using sequential signals SCAN(1) (for the first row of pixels 22), SCAN(2) (for the second row of pixels 22), . . . SCAN(N) (for the nth row of pixels 22). Scan signals SCAN(i) may be provided to the rows of pixels 22 in display 14 using respective gate lines G of FIG. 1. As each SCAN signal is asserted, data is loaded into storage capacitors Cs for the pixels 22 in the row in which the SCAN signal is being asserted. At the end of each 1/60 sec period, global signal GS is deasserted (taken to low voltage Voff) for time T. The duration of off time T and off voltage Voff for global signal GS may be selected to help stress-balance oxide transistor T1 (i.e., to ensure that positive gate bias temperature stress (PBTS) and negative gate bias temperature stress (NBTS) balance each other to avoid undesired threshold voltage shifts over the lifetime of transistors T1).

During low-frequency operation (e.g., at 1 Hz in the example of FIG. 3), signal GS is asserted for the first 1/60 sec of the 1 sec period of the image frame for display 14 while scan signals SCAN are used to load data into each of the rows of pixels 22 in display 14. During the remainder of the frame (i.e., for the rest of the 1 second frame period), the global GS signal is maintained in its low (Voff) level to turn off transistors T1. Transistors T1 are low leakage current semiconducting-oxide transistors, so turning off transistors T1 ensures that the loaded data on storage capacitors Cs will be maintained accurately for the duration of the image frame. Because transistors T1 are turned off for substantial periods of time (e.g., whenever there is 1 Hz operation), the scheme of FIG. 3 helps to balance gate stress (i.e., PBTS and NBTS) in transistors T1, even though there are also often long periods of time in which transistors T1 are on (e.g., when transistors T1 are being used during normal 60 Hz operation).

If desired, the gates of series-connected transistors T1 and T2 may be controlled in parallel using a common control signal such as signal SCAN of FIG. 4. In the arrangement of FIG. 4, each pixel 22 in a given row of display 14 has an input that is shorted to both the gate of transistor T1 and to the gate of transistor T2. As with the arrangement of FIG. 2, transistor T2 may be a silicon transistor that is characterized by a small gate-source capacitance Cgs and that therefore induces only a small kickback voltage on the gate of drive transistor TD, whereas transistor T1 may be a semiconducting-oxide transistor that exhibits low leakage current, thereby helping to reduce leakage during low frequency refresh rate operation for the frames of display 14. The on resistance of series-connected transistors T1 and T2 may be comparable to the on resistance of only a single semiconducting-oxide transistor.

Figure 5:
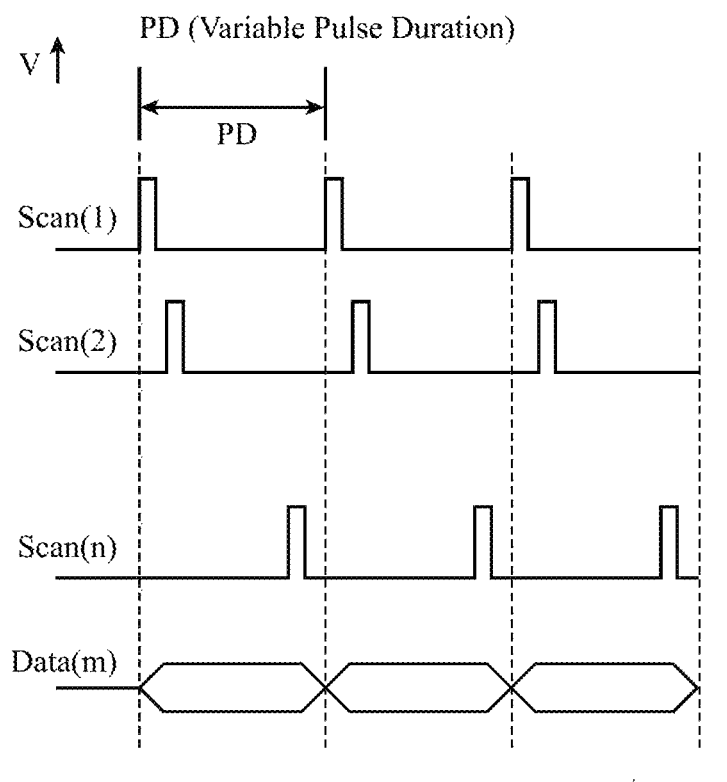
FIG. 5 is a timing diagram showing illustrative signals involved in operating a display having pixels of the type shown in FIG. 4 in accordance with an embodiment.

FIG. 5 is a timing diagram showing how a control scheme of the type shown in FIG. 4 may be used when operating display 14 in a variable pulse duration mode. As shown in FIG. 5, frames of image data may be loaded into the rows of display 14 by asserting control signal SCAN in each of the rows of display 14 in sequence during frames of variable duration PD. The period PD may be 1/60 sec or other suitable duration during normal operation and may be extended to longer time periods (e.g., a time period of 1 s) when it is desired to reduce the image frame refresh rate for display 14. Schemes of the type shown in FIG. 5 may sometimes be referred to as variable pulse duration schemes because the length of time PD may be continuously varied. The use of a common control signal (SCAN) to control both transistors T1 and T2 in parallel for the pixels 22 in each row of display 14 as opposed to the separate GS and SCAN signals used to control the gates of transistors T1 and T2 of pixel 22 of FIG. 2 helps to reduce the number of control lines in display 14.

Figure 6:
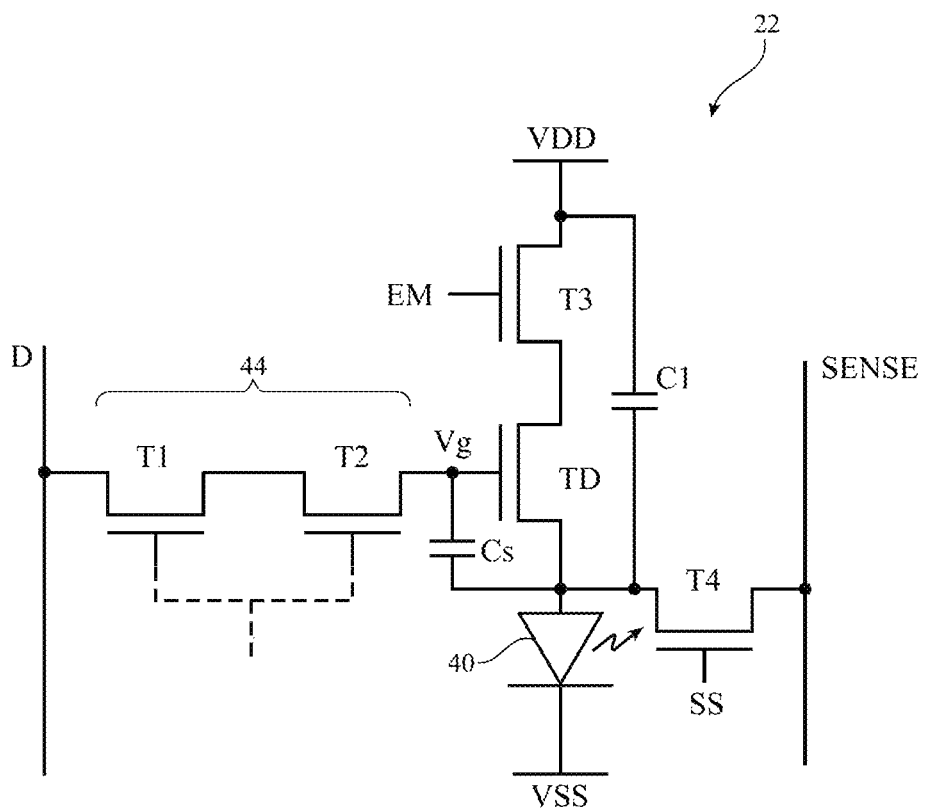
FIG. 6 is a pixel circuit having an optional sense transistor, optional capacitor, and optional emission control transistor in accordance with an embodiment.

If desired, pixels 22 (e.g., pixels such as pixel 22 of FIG. 2, pixel 22 of FIG. 4, and/or other pixels 22 for display 14) may be provided with one or more additional components such as additional transistor(s), capacitor(s), signal line(s), etc. Consider, as an example, the illustrative pixel circuit of FIG. 6. As shown in illustrative pixel 22 of FIG. 6, pixels 22 may, if desired, be provided with an emission enable transistor such as transistor T3. Transistor T3 may be coupled in series with drive transistor TD and may be turned on and off using emission enable control signal EM (e.g., T3 may be turned on during normal operation to allow transistor TD to adjust the amount of drive current flowing through light-emitting diode 40 and may be turned off when it is desired to stop the flow of current Id to perform other pixel operations). Sense line SENSE and optional sense transistor T4 may be used in sensing the current Id of drive transistor TD (e.g., to evaluate transistor aging effects). Sense transistor T4 may be controlled by sense control signal SS on the gate of transistor T4. Optional capacitor C1 may be included in pixel 22 to help improve the stability of the gate voltage Vg on the gate of drive transistor TD at the end of each data programming period. Transistors T1 and T2 may be controlled using independently adjustable control signals as described in connection with pixel 22 of FIG. 2 or may be controlled using a common control signal as descried in connection with pixel 22 of FIG. 4. Pixels 22 with series-connected semiconducting-oxide and silicon transistors (i.e., transistors T1 and T2) in switching circuitry 44 may include sense transistor T4, capacitor C1, and/or emission transistor T3, and/or other optional components. The configuration of FIG. 6 is merely illustrative.

Figure 7:
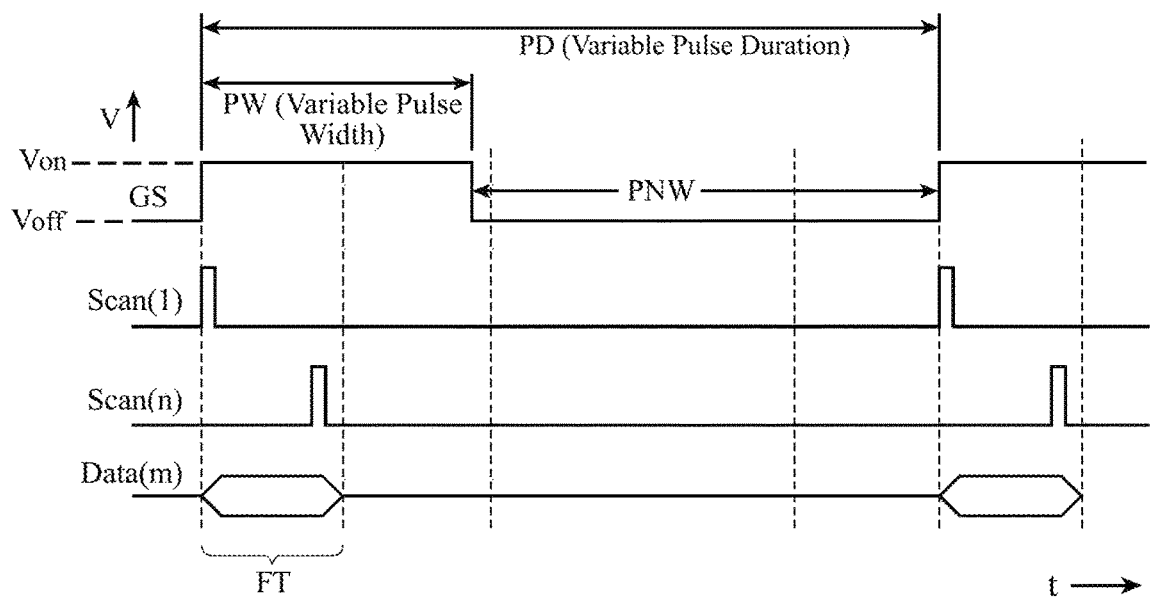
FIGS. 7 and 8 are timing diagrams showing illustrative signals involved in operating displays in accordance with embodiments.
Figure 8:
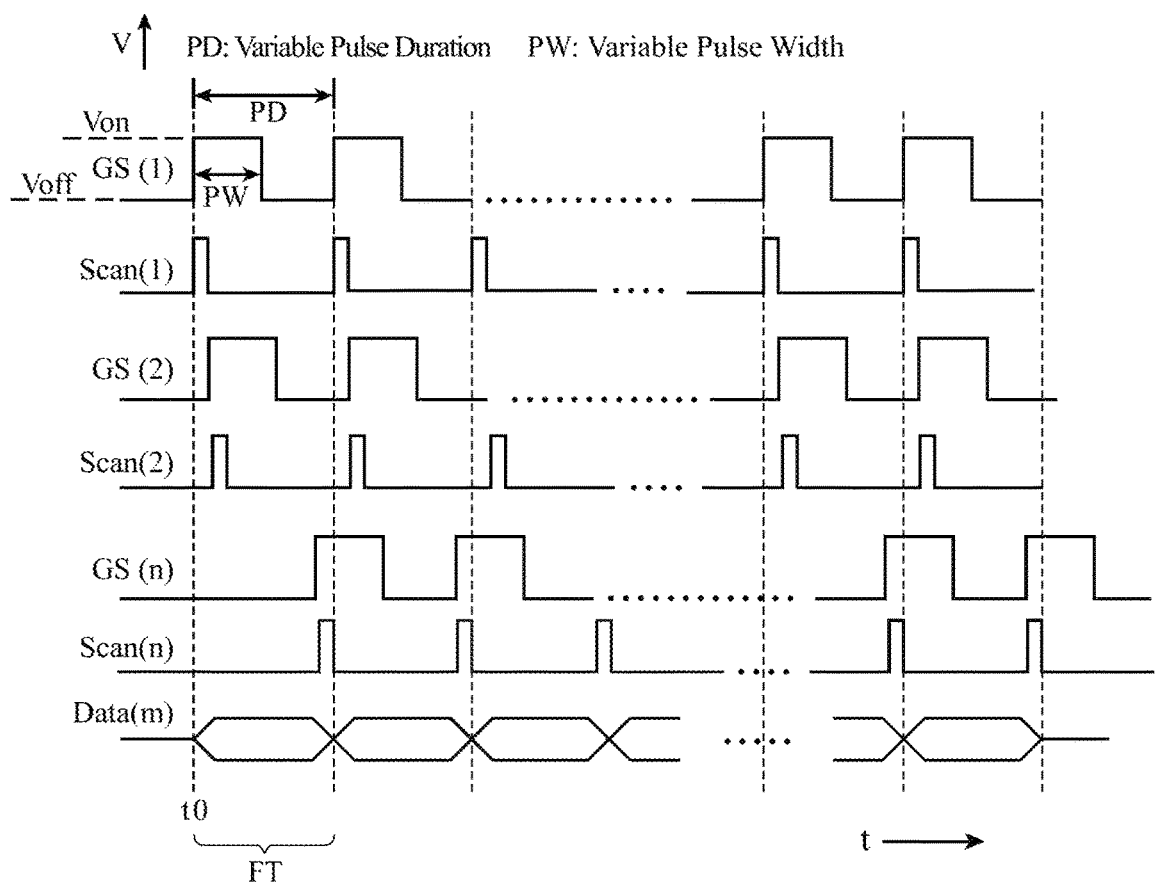

To prevent undesired long-term changes in the performance of pixels 22, it may be desirable for the display driver circuitry of display 14 to use a pattern of control signals for pixels 22 that balances gate stress (i.e., PBTS and NBTS for transistors such as semiconducting-oxide transistor T1). In the illustrative control arrangement of FIG. 3, PBTS and NBTS for transistor T1 is more balanced than in arrangements in which only a single semiconducting-oxide transistor were used for transistor switching circuitry 44, because control signal GS can be held at Voff for relatively long periods of time during low frequency refresh rate operations. FIGS. 7 and 8 show additional illustrative control schemes that may be used for controlling the transistors of circuitry 44 to help balance gate stress for transistor T1.

In the arrangement of FIG. 7, data is loaded in one frame time FT (i.e., by asserting each of scan signals SCAN in sequence until all of the rows of pixels 22 in display 14 have been loaded with image data), but global control signal GS is asserted for more than one frame time (i.e., the duration of variable pulse width PW is longer than FT to help balance PBTS and NBTS for transistors T1). The duration of PW may be 10% longer than FT or more, may be twice FT or more, may be three or more times FT, or may be any other suitable value. By extending PW relative to FT, the balance between the on period for T1 (PW) can be adjusted relative to the off period for T1 (PNW). The amount of time for which Von is applied to the gate of T1 (i.e., PW) relative to the amount of time for which Voff is applied to the gate of T1 (i.e., PNW) and the values of Von and Voff may be adjusted by the display driver circuitry of display 14 to balance gate stress.

In the illustrative arrangement of FIG. 8, different signals GS(i) are applied to the gates of transistors T1 in different respective rows of pixels 22 (i.e., GS is not a global signal in the example of FIG. 8). The position of each signal GS(i) is in each row is synchronized with respect to the SCAN signal of that row and is shifted progressively relative to the beginning of each frame (i.e., relative to start time [[time]] t0 in frame F1), as with scan signals SCAN(i). The amount of time that each signal GS is asserted during a frame relative to the amount of time that the signal GS in that frame is deasserted may be adjusted to balance gate stress. In the example of FIG. 8, GS is asserted for half of each frame and is deasserted for a half of each frame to balance gate stress on transistors T1 (i.e., to balance PBTS and NBTS), but this is merely illustrative. Signal GS may be asserted and deasserted for other suitable time periods to balance gate stress. For example, if transistors T1 are more sensitive to stress when positive gate voltages are applied than when negative gate voltages are applied, this increased sensitivity can be taken into account by appropriate adjustment of the relative amounts of time when a positive voltage is applied to the gate of transistor T1 (i.e., when GS is asserted) versus when a negative voltage is applied to the gate of transistor T1 (i.e., when GS is deasserted). Adjustment of the values of Von and Voff may also be used to balance gate stress. The length of each frame (duration PD) may be shortened during normal operation and lengthened during low refresh rate operations (i.e., variable refresh rate operations may be supported).

If desired, display 14 may be a liquid crystal display. In this type of configuration, pixels 22 may each include electrodes that are used to apply electric fields to respective pixel-sized portions of a layer of liquid crystal material in the display. Series-connected transistors T1 and T2 may be used to form switching circuitry 44 in each pixel 22.

Figure 9:
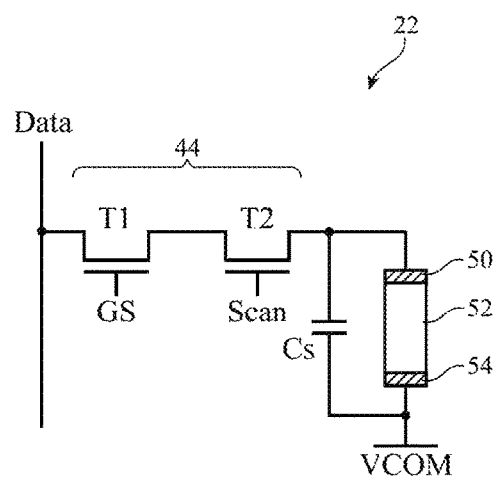
FIGS. 9 and 10 are diagrams of illustrative pixel circuits for liquid crystal displays in accordance with embodiments.
Figure 10:
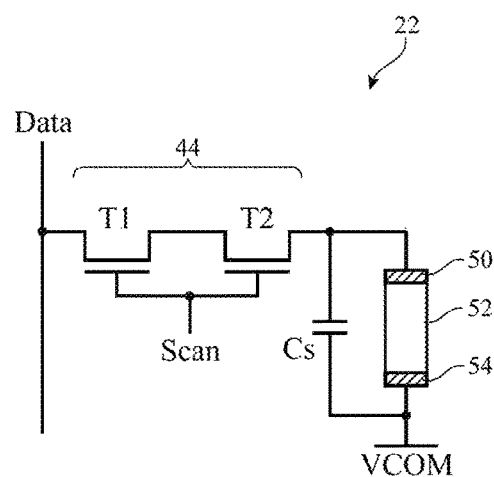

Consider, as an example, the liquid crystal display arrangement of FIG. 9. As shown in FIG. 9, liquid crystal display pixels 22 may have liquid crystal portion 52. Liquid crystal portion 52 may form a portion of a layer of liquid crystal material that is interposed between an upper and lower polarizer in display 14. The strength of the electric field applied to portion 52 may be controlled to adjust the light transmission through pixel 22. Transistor switching circuitry 44 may include series-connected transistors T1 and T2. Transistor T1 may be a semiconducting-oxide transistor and transistor T2 may be a silicon transistor. Switching circuitry 44 may be coupled between data line DATA and storage capacitor Cs. During data loading operations, transistors T1 and T2 are turned on so that data is loaded from data line DATA onto capacitor Cs. The voltage on capacitor Cs is applied across liquid crystal portion 52 using electrodes 50 (e.g., a set of electrode fingers) and 54 (e.g., a blanket common electrode carrying common voltage Vcom). The value of Cs is preferably sufficient to maintain a desired electric field across liquid crystal portion 52 for the duration of each image frame. In the illustrative configuration of FIG. 9, transistors T1 and T2 are controlled using separate control signals GS and SCAN and may be operated as described in connection with FIGS. 3, 7, and 8. As shown in the illustrative configuration of FIG. 10, transistors T1 and T2 may be controlled using a common SCAN control signal (see, e.g., the control scheme of FIG. 5). As with the display driver circuitry for an array of pixels in a light-emitting diode display, the display driver circuitry for a liquid crystal display containing pixels 22 of the type shown in FIGS. 9 and 10 may be configured to control transistors T1 and T2 using control signals that help balance gate stress in transistors T1.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
   display driver circuitry;
   an array of pixels, wherein a given pixel in the array includes an organic light-emitting diode and a drive transistor coupled in series with the organic light-emitting diode; and
   a plurality of data lines each of which supplies data to an associated column in the array of pixels from the display driver circuitry, wherein the given pixel has a semiconducting-oxide transistor and a silicon transistor coupled in series to the drive transistor in the given pixel and wherein the silicon transistor is coupled between the semiconducting-oxide transistor and the drive transistor.

2. The display defined in claim 1, wherein the drive transistor has a gate and the semiconducting-oxide transistor and the silicon transistor are coupled in series to the gate of the drive transistor.

3. The display defined in claim 2, wherein the silicon transistor is coupled between the gate of the drive transistor and the semiconducting-oxide transistor.

4. The display defined in claim 3, wherein the silicon transistor has a source-drain terminal that is coupled to a capacitor.

5. The display defined in claim 4, wherein the source-drain terminal of the silicon transistor is coupled to the gate of the drive transistor.

6. The display defined in claim 4, wherein the drive transistor has a source-drain terminal and the semiconducting-oxide transistor and the silicon transistor are coupled in series to the source-drain terminal of the drive transistor.

7. The display defined in claim 1, wherein the semiconducting-oxide transistor has an active region that is formed from a semiconducting-oxide material.

8. The display defined in claim 7, wherein the silicon transistor has an active region that is formed from silicon.

9. The display defined in claim 1, wherein the semiconducting-oxide transistor has a gate that receives a first control signal from the display driver circuitry and the silicon transistor has a gate that receives a second control signal from the display driver circuitry that is different from the first control signal.

10. A display, comprising:
  display driver circuitry that supplies data on data lines and that supplies control signals; and
  an array of pixels having a pixel that includes a light-emitting diode and a drive transistor, wherein the drive transistor has a gate and is coupled to the light-emitting diode, wherein the pixel includes switching circuitry coupled to the gate of the drive transistor, wherein the switching circuitry includes a semiconducting-oxide transistor having a source-drain terminal and a silicon transistor having a source drain terminal coupled to the source-drain terminal of the semiconducting-oxide transistor, wherein the silicon transistor is interposed between the semiconducting-oxide transistor and the gate of the drive transistor, and wherein the semiconducting-oxide transistor has a channel region formed from semiconducting-oxide material.

11. The display defined in claim 10, wherein the silicon transistor is connected to the gate of the drive transistor.

12. The display defined in claim 11, wherein the pixel includes a storage capacitor connected to the gate of the drive transistor.

13. The display defined in claim 12, wherein the capacitor has a first terminal coupled to the gate of the drive transistor and a second terminal coupled to a path between the drive transistor and the light-emitting diode.

14. The display defined in claim 13, wherein the pixel has an emission enable transistor coupled in series with the drive transistor and the light-emitting diode.

15. A display, comprising:
  display driver circuitry that supplies data on data lines and that supplies control signals; and
  an array of pixels having a pixel that includes a light-emitting diode and a drive transistor, wherein the drive transistor has a gate and is coupled to the light-emitting diode, wherein the pixel includes switching circuitry coupled to the gate of the drive transistor, wherein the switching circuitry includes a semiconducting-oxide transistor and a silicon transistor, and wherein the silicon transistor is coupled between the gate of the drive transistor and the semiconducting-oxide transistor.

16. The display defined in claim 15, wherein the semiconducting-oxide transistor and the silicon transistor are coupled in series.

17. The display defined in claim 16, wherein the semiconducting-oxide transistor has a channel region that is formed from a semiconducting-oxide material.

18. The display defined in claim 17, wherein the silicon transistor has a channel region that is formed from a semiconductor material.

19. The display defined in claim 15, wherein a source-drain terminal of the semiconducting-oxide transistor is directly connected to a source-drain terminal of the silicon transistor.

* * * * *